(No Model.) 2 Sheets—Sheet 1.

A. A. CAPELING.
VEHICLE SPRING.

No. 365,579. Patented June 28, 1887.

WITNESSES:
N. M. Seamans
C. Bendixon

INVENTOR:
Albert A. Capeling
BY
Duell, Lass & Duell
ATTORNEYS.

(No Model.) 2 Sheets—Sheet 2.

A. A. CAPELING.
VEHICLE SPRING.

No. 365,579. Patented June 28, 1887.

WITNESSES:
A. F. Walz,
C. Bendixon

INVENTOR:
Albert A. Capeling
BY
Duell, Lasst Duell
ATTORNEYS.

UNITED STATES PATENT OFFICE.

ALBERT A. CAPELING, OF ONEIDA, NEW YORK.

VEHICLE-SPRING.

SPECIFICATION forming part of Letters Patent No. 365,579, dated June 28, 1887.

Application filed February 3, 1887. Serial No. 226,397. (No model.)

*To all whom it may concern:*

Be it known that I, ALBERT A. CAPELING, of Oneida, in the county of Madison, in the State of New York, have invented new and useful Improvements in Vehicle-Springs, of which the following, taken in connection with the accompanying drawings, is a full, clear, and exact description.

This invention consists in a novel construction of vehicle-springs and their connections with the vehicle and body of the same, which springs are allowed free vibratory movement throughout their lengths, and are simple and adjustable to vary the degree of their elasticity, and are adapted to be readily shifted from one vehicle onto another, and possess various other important advantages over other vehicle-springs, all as hereinafter more fully described, and specifically set forth in the claims.

Figure 1:
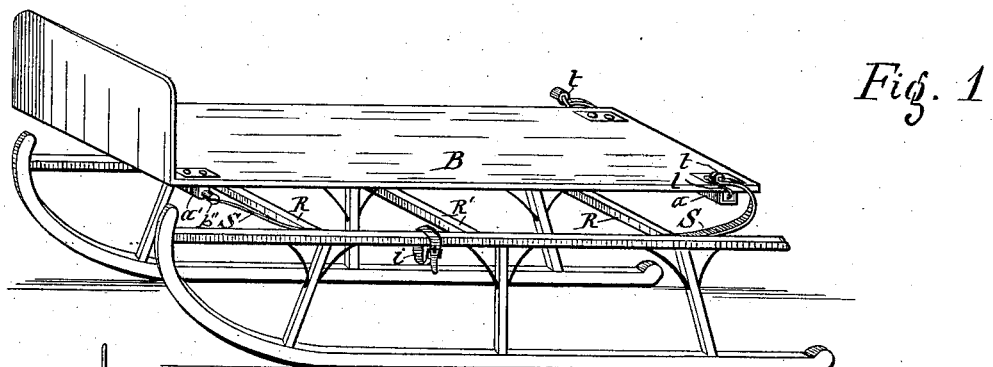
Figure 2:
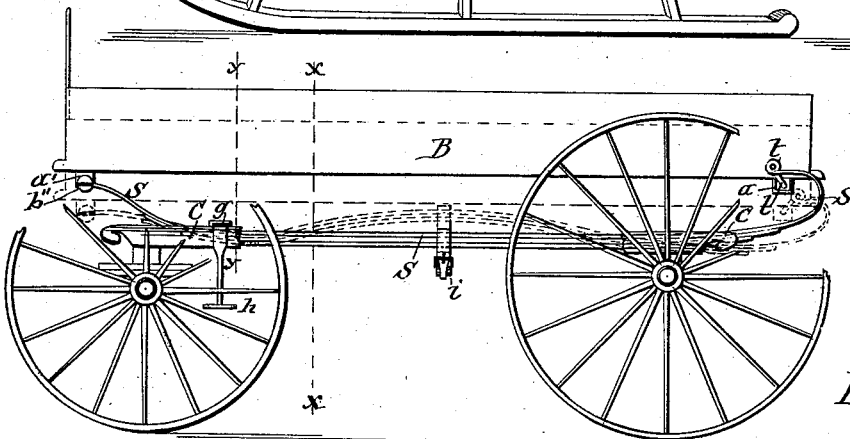
Figure 3:
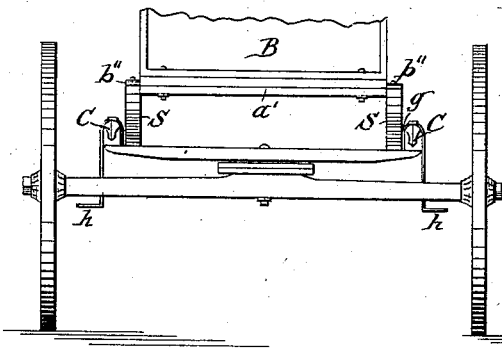
Figure 4:
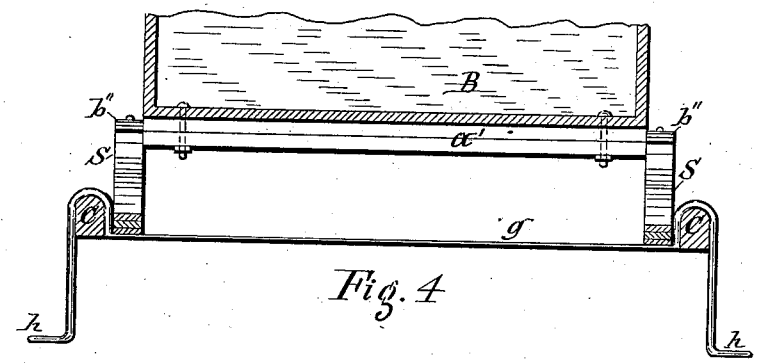
Figure 5:
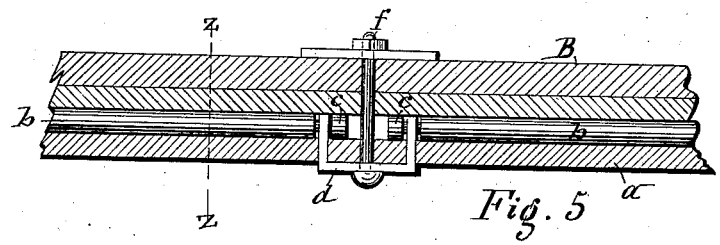
Figure 6:
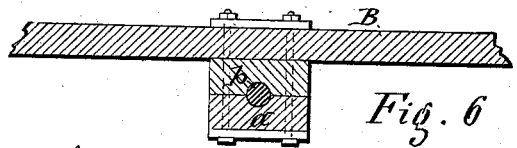
Figures 7, 8, 9:
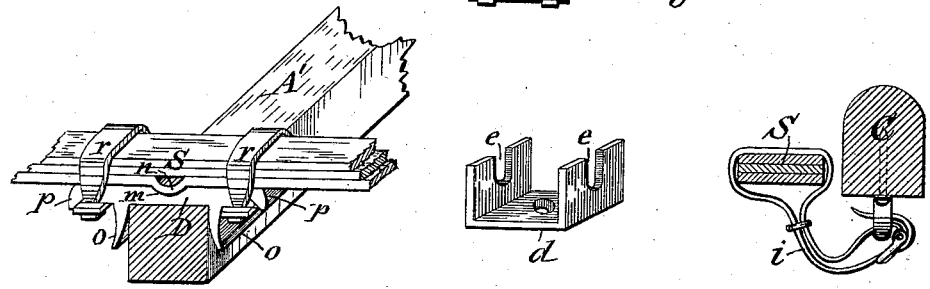

In the annexed drawings, Figure 1 is a perspective view of a sleigh provided with my improved springs. Fig. 2 is a side elevation showing my invention applied to a side-bar vehicle, a portion of the side bar being broken away to show the central portion of the spring. Fig. 3 is a front view of the same. Fig. 4 is an enlarged transverse section on line $x\,x$, Fig. 2, facing toward the front of the vehicle. Fig. 5 is a longitudinal section of the body-supporting cross-bar with the spring-coupling bar journaled therein. Fig. 6 is a transverse section on line $z\,z$, Fig. 5. Fig. 7 is a detached isometric view of the coupling-link by which the two sections of the divided spring-coupling bar are connected together. Fig. 8 is an isometric view of that part of my invention by which the spring is mounted on the rear axle or bolster; and Fig. 9 is an enlarged transverse section of the spring and side bar, showing the connection of said parts by the lazy-strap.

Similar letters of reference indicate corresponding parts.

S represents my improved vehicle spring, composed of a long top leaf with shorter leaves secured to the bottom thereof in any usual and well-known manner. Two of these springs are arranged lengthwise the vehicle and a proper distance apart to support the body B between them. Said springs are of sufficient lengths to allow them to be supported on the vehicle at points between the central and end portions of the springs. They are mounted loosely on the vehicle, and their central portions are free to vibrate vertically, and consequently the springs are rendered elastic throughout their lengths, and are also adapted to be readily shifted from one vehicle onto another or from a wagon onto a sleigh. When applied to a sleigh, as illustrated in Fig. 1 of the drawings, the springs are seated on the end cross-rails, R R, of the sleigh, the central rail, R', being merely used for the purpose of bracing the sleigh, and in light sleighs it may be dispensed with. When the springs are to be used on a wagon, as represented in Fig. 2 of the drawings, the rear end portions of said springs are mounted either on the hind axle or on a bolster secured to said axle.

The forward end portions of the springs are mounted on a cross-bar or head-block, which may be secured either to the top or upper section of the fifth-wheel or to some other suitable cross-bar pivoted to the forward axle by the king-bolt. I prefer, however, to employ two side bars, C C, secured at opposite ends to the hind and front running-gear in any suitable manner, and on the said side bars, at a suitable distance back from the forward axle, I hang a cross-bar, $g$, upon which I mount loosely the forward portions of the springs, so as to allow the latter to slide longitudinally thereon. The rear portions of the springs I secure to the hind axle or bolster, A', by means of metallic saddles D, which are placed astride the support A', and are each formed with downward-projecting and flaring flanges $o\,o$ at the front and rear of said support, as shown in Fig. 8 of the drawings, and with front and rear extensions, $p\,p$, and provided with a recess, $m$, in the top. The spring S lies upon this saddle and has its bottom leaf formed with a transverse rib, $n$, which enters the recess $m$, and by clips $r\,r$ the spring is secured to the extensions $p\,p$.

The described saddle D serves to prevent the spring from slipping longitudinally on its support A', and the flare of the flanges $o\,o$ allows the saddle to rock, so that the spring may deflect vertically from its normal shape when subjected to a load, as represented by dotted lines in Fig. 2 of the drawings.

To the bottom of the forward end of the body B, I secure a longitudinally-divided wooden cross-bar, a', between the two sections of which I journal a metallic cross-bar, b', the extremities of which project at the sides of the body and are provided with heads b'', to which I fasten the front ends of the springs S S, which latter are curved upward from their main portions and then curved reverse into forward projections extending through the heads b'', to which they are attached.

The object of employing the divided wooden cross-bar a' is, first, to brace the body, and, secondly, to render the bearing of the metallic cross-bar b' adjustable, so as to take up the wear of said bearing, which is readily accomplished by taking the wooden cross-bar apart and planing off the adjacent faces of the sections of said cross-bar sufficiently to bring them to proper bearings on the inclosed metallic bar when replaced. The rear end of each spring S I curve upward and thence over and forward and terminate it in an eye, t, and to the bottom of the rear portion of the body B, I secure a longitudinally-divided wooden cross-bar, a, similar to the cross-bar a', at the forward portion of the body.

In the cross-bar a, I journal a metallic cross-bar, b, which is divided transversely at or near the center of its length, and the adjacent ends of the two sections of said metallic bar I provide with heads c c. A link or metallic strap, d, has its ends bent at right angles, and provided with slots or notches e e, adapted to receive the portion of the bar b immediately back of the heads c c. Said link, hooking by its end portions onto the aforesaid heads, forms a swivel-coupling of the two sections of the bar b. A bolt, f, passing through the center of the link d and between the heads c c and through the bottom of the body, fastens said link to the body. The outer ends of the bar b are formed into upwardly-projecting cranks l l, terminating in horizontal trunnions, on which the eyes of the rear ends of the springs are journaled.

It will be observed that the springs are thus connected to the body, so that both can be shifted simultaneously from one vehicle onto another, which can be readily accomplished, inasmuch as the springs are loosely mounted on the vehicle.

The action of my improved springs is as follows: It will be observed that each of the long side springs works over two fulcrums, respectively, between the center and ends of the spring, and when a load is applied to the body B the end portions thereof rise, as represented by dotted lines in Fig. 2 of the drawings. The forward portions of the springs slide very slightly rearward on their supports on the vehicle to compensate for the upward deflection of the central portions of the springs, and the cranks l l of the rear metallic bar, b, swing rearward to compensate for the distentions of the rear end portions of the springs when depressed. These latter portions of the springs may, however, be extended farther toward the front, so as to bring the connection of the springs with the body B, nearly directly over the supports of the springs on the vehicle, or even forward from said point, and in such a case the cranks l l would normally stand in a rearwardly-inclined position.

i i are so-called "lazy-straps," which loosely embrace the springs, and are connected to the adjacent side bars of the wagon or raves of the sleigh, as best seen in Fig. 9 of the drawings, and are the only means necessary for tying the spring to the wagon or sleigh. They are preferably leather straps provided with buckles, which allow them to be readily detached when desired to remove the springs from the vehicle, and to be lengthened or shortened, as may be desired, to properly connect the aforesaid parts, and to limit the vibration of the spring, so as to prevent the body, when unusally heavily loaded, from settling excessively and coming to a rigid bearing on the wagon or sleigh.

The spring supporting-bar g, I form with downward extensions at the outside of the side bars of the vehicle, and terminate said extensions with steps h h, as illustrated in Fig. 4 of the drawings.

Having described my invention, what I claim as new, and desire to secure by Letters Patent, is—

1. The combination, with the running-gear and vehicle body, of side springs supported on the running-gear at points between the centers and ends of the springs and having their center portions free to vibrate vertically and their end portions curved upward, and oscillatory couplings connecting the end portions of the spring with the body of the vehicle, as set forth.

2. The combination, with the running-gear and body of the vehicle, of side springs supported on the running-gear at points between the centers and ends of the springs and having their central portions free to vibrate vertically and their end portions curved upward, and bars extended across the bottom of the body and adapted to turn axially thereon, and the ends of the springs connected to the said bars, as set forth.

3. The combination, with the running-gear and body of the vehicle, of side springs supported on the running-gear at points between the centers and ends of the springs and having their central portions free to vibrate vertically and their end portions curved upward, bars extended across the bottom of the body and adapted to turn axially thereon, the forward ends of the springs being attached to one of said bars, and cranks on the other bar connected with the rear ends of the springs, substantially as described and shown.

4. In combination with the vehicle-body and side springs, wooden cross-bars supporting the body and divided longitudinally, and metallic bars journaled in the joint of the wooden cross-bars and having their ends connected to the aforesaid springs.

5. In combination with the body and side springs, a transversely-divided metallic cross-bar journaled to the bottom of the body and having the outer ends of its sections connected with the aforesaid springs and the inner ends of said sections provided with heads, and a swivel-coupling engaging the cross-bar sections back of their heads, substantially as described and shown.

6. In combination with the body and side springs, the wooden cross-bar $a$, divided longitudinally, the metallic bar $b$, divided transversely and journaled longitudinally between the sections of the cross-bar $a$ and the sections of the bar $b$, formed with heads $c\ c$ on their inner ends, the coupling-link $d$, having the notches $e\ e$, and the bolt $f$, passing through the center of the said link and fastening the same to the body, substantially as described.

7. In combination with a side-bar vehicle, the cross-bar $g$, hung on the forward portions of the side bars, and the side springs, S S, mounted at their rear ends on the bolster or axle and at their forward ends on the aforesaid cross-bar and having their central portions free to vibrate vertically and their end portions curved upward and supporting the body, as set forth and shown.

8. In combination with the vehicle and its body, the side springs, S S, supported between their central portions and end portions on the vehicle and having their central portions free to vibrate vertically, their front-end portions curved upward and forward and supporting the forward end of the body, and their rear end portions curved upward, thence over and forward, and the cross-bar $b$, journaled on the body and formed with cranks $l\ l$, connected with the rear ends of the springs, substantially as described.

9. In combination with the vehicle and the side springs, S S, supported between their central portions and forward end portions on the vehicle and having their central portions free to vibrate vertically, the saddles D, mounted on the hind axle or bolster and provided with the recesses $m$, and the springs provided with the transverse ribs $n$, substantially as described and shown, for the purpose set forth.

10. In combination with a vehicle and its body, the side springs, S S, supported between their centers and ends on the vehicle and having their central portions free to vibrate vertically and their end portions supporting the body, and the lazy-straps $i\ i$, connecting the central portions of the springs with the vehicle, substantially as and for the purpose set forth.

11. In combination with the vehicle and the side springs, S S, supported between their central portions and forward end portions on the vehicle and having their central portions free to vibrate vertically, the saddles D, mounted on the hind axle or bolster and formed with the downward-projecting and flaring flanges $o\ o$ and with the horizontal extensions $p\ p$ and recesses $m$, the springs provided with the transverse ribs $n$, and the clips $r\ r$, fastening the springs to the extensions $p\ p$, substantially as described and shown.

In testimony whereof I have hereunto signed my name and affixed my seal, in the presence of two attesting witnesses, at Syracuse, in the county of Onondaga, in the State of New York, this 10th day of January, 1887.

ALBERT A. CAPELING. [L. S.]

Witnesses:
H. P. DENISON,
C. BENDIXON.